(12) United States Patent
Monroe

(10) Patent No.: US 6,360,988 B1
(45) Date of Patent: Mar. 26, 2002

(54) PERSONNEL LIFT DEVICE AND AMUSEMENT USE THEREOF

(76) Inventor: James I. Monroe, 23 Fairlane Dr., Canton, NY (US) 13617

( * ) Notice: Subject to any disclaimer, the term of this patent is extended or adjusted under 35 U.S.C. 154(b) by 0 days.

(21) Appl. No.: 09/542,725

(22) Filed: Apr. 4, 2000

(51) Int. Cl.$^7$ .................................................. B64B 1/40
(52) U.S. Cl. ............................ 244/31; 244/33; 472/131
(58) Field of Search ...................... 244/31, 33; 472/131, 472/134, 137, 130, 49, 50

(56) References Cited

U.S. PATENT DOCUMENTS

| 4,995,572 | A | * | 2/1991 | Piasecki | 244/33 |
| 5,391,115 | A | * | 2/1995 | Bessey | 244/31 |
| 5,449,130 | A | * | 9/1995 | Huntington | 244/33 |
| 5,813,627 | A | * | 9/1998 | Huntington | 244/33 |

* cited by examiner

*Primary Examiner*—J. Woodrow Eldred
(74) *Attorney, Agent, or Firm*—Greenwald & Basch LLP; Duane C. Basch

(57) ABSTRACT

The present invention is an apparatus to partially counter normal gravitational force. The personnel lifting device is a paraballoon, a lighter-than-air gas-filled balloon having a harness to suspend a user therefrom. The paraballoon further includes a plurality of flaps extending therefrom in order to allow the paraballoon to be maneuvered during descent, wherein the paraballoon may be used as a component of an amusement. In addition, various applications and attachments and embodiments are described.

5 Claims, 9 Drawing Sheets

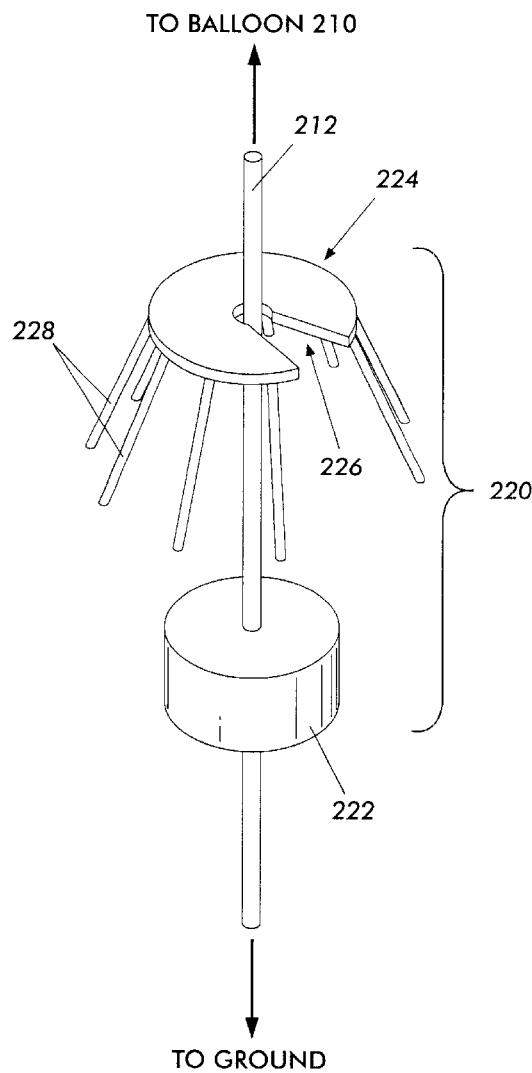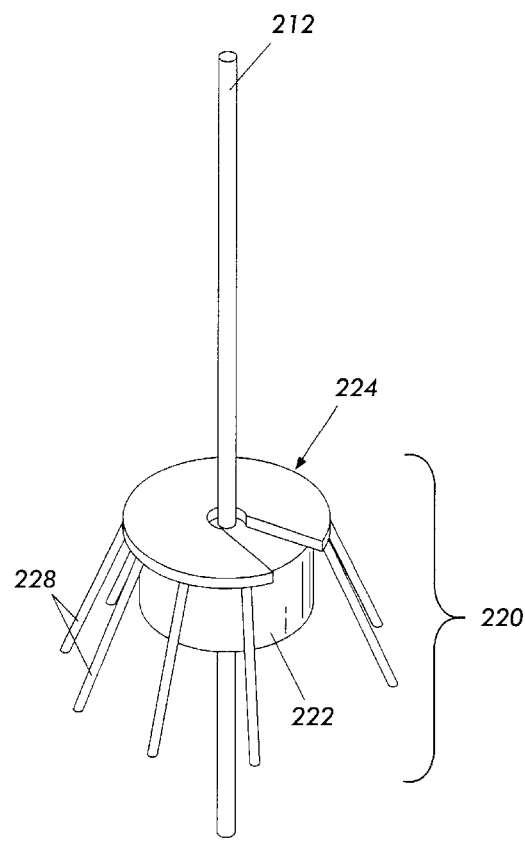
FIG. 9
FIG. 10

PERSONNEL LIFT DEVICE AND AMUSEMENT USE THEREOF

BACKGROUND AND SUMMARY OF THE INVENTION

The present invention is an apparatus for providing an upward lifting force to an individual(s), so as to enable the individual to partially counteract the earth's normal gravitational force, thereby allowing for a slower, controlled descent from an elevated position.

Heretofore, a number of patents and publications have disclosed various balloon apparatus for use in lifting objects, the relevant portions of which may be briefly summarized as follows:

U.S. Pat. No. 1,183,786 to Bumbaugh, issued May 16, 1916, discloses an attachment for a balloon wherein upon emergency deflation the balloon turns into a parachute. U.S. Pat. No. 3,679,155 to Centofanti, issued Jul. 25, 1972, teaches a balloon and parachute combination wherein the parachute is positioned over and around the balloon.

U.S. Pat. Nos. 4,055,316, 4,640,474 and 5,080,302 are all directed to equipment or methods for the aerial transport of goods using balloons. Each deals with a unique tether or ballasting feature. U.S. Pat. No. 5,080,302 teaches a tethering or control system. U.S. Pat. No. 5,391,115 describes an apparatus for simulating a lower gravity environment, wherein a large balloon provides a buoyant upward force and is attached to a sturdy frame that in turn is secured to a harness for anchoring the user to the apparatus. The frame is attached to the balloon with a rotating hinge, allowing for horizontal rotation of the individual.

U.S. Pat. No. 5,449,130 discloses a hot air balloon ride including a balloon envelope having a suspended basket. When inflated, the balloon is restrained by tether lines extending from grounded weights, the tether lines limiting extent of rise of the balloon. Also disclosed are a pair of rip panels incorporated into the crown of the balloon, one of which is manually operable and the other of which would operate automatically if the balloon becomes disengaged from the tether lines.

U.S. Pat. No. 5,967,459 teaches a floatable aircraft such as a parachute balloon. The parachute balloon is comprised an envelope which can be collapsed and stored during periods of nonuse. A parachute is attached to the envelope, enabling the parachute balloon to fall safely by the effect of the parachute in various circumstances including the usual descent or an emergency during a fall, such as when out of fuel. The various figures depict material flaps, skirts and/or air vents that are indicated to provide steering during descent.

In accordance with the present invention, there is provided a personnel lifting device comprising: a sealed, inflatable balloon filled with a light-than-air gas; and a harness attached thereto for suspending an individual below the balloon wherein said balloon has a plurality of spaced-apart flaps permanently extending therefrom and operatively associated therewith, the attitude of at least one of said flaps being adjustable by the individual so as to permit the individual to control the direction of descent and rate of the personal lifting device in free fall from an elevated position.

A gravitational force adjustment system for accurately limiting a terminal velocity of a personnel lifting device including a sealed, inflatable balloon filled with a lighter-than-air gas and a harness attached thereto for suspending an individual below the balloon, said gravitational force adjustment system comprising: means for determining a gross lifting force created by the personnel lifting device and harness; a scale for determining the weight of the individual; and a terminal velocity computer, said calculator receiving the gross lifting force, the weight of the individual, and a selectable net lifting force and producing an adjustment weight necessary to provide the limiting terminal velocity when the individual is attached to the balloon using the harness.

In accordance with a further aspect of the present invention, there is provided an amusement to be played by at least one user, including: a personnel lifting device for the user, said personnel lifting device comprising a sealed, inflatable balloon filled with a lighter-than-air gas and a harness attached thereto for suspending an individual below the balloon; and a plurality of obstacles that must be navigated by the user while wearing the personnel lifting device.

In accordance with yet another aspect of the present invention, there is provided a lifting system, including: a personnel lifting device including a sealed, inflatable balloon filled with a lighter-than-air gas and a harness attached thereto for suspending the user below the balloon; and an auxiliary lifting balloon filled with lighter-than-air gas, said auxiliary lifting balloon being temporarily coupled to the personnel lifting device, wherein the auxiliary lifting balloon in combination with the personnel lifting device provides a net upward lifting force to the user.

In accordance with yet a further aspect of the present invention, there is provided a gas storage system for a personnel lifting device including a lighter-than-air balloon, including: a low pressure storage tank; and a compressor to pump the lighter-than-air gas from the balloon to the storage tank so as to cause at least a partial deflation of the balloon, wherein the pressure of the lighter-than-air gas in the tank is at most thirty times the nominal pressure of the gas applied to the balloon, wherein the storage system allows the long-term re-use of the lighter-than-air gas and facilitates storage of the balloon in an at least partially deflated state.

One aspect of the invention is based on the observation of problems with conventional lighter-than-air flight systems is their reliance on a "pilot," a ballast and/or fuel system to control the flight. Very little control is left to the inexperienced user. Moreover, existing low-gravity jumping apparatus (e.g., Parabounce™) require tethering and or have crude methods of adjusting the net lift of the apparatus with the user. Furthermore, such systems merely allow for bouncing or jumping, and do not contemplate descent from elevated positions or an ability to maneuver or control the apparatus. Additonally, the present system facilitates inexpensive storage and transportation of the balloon by employing a compressor for deflation of the balloon and storage of the light-than-air gas within a slightly pressurized storage tank.

This aspect is based on the discovery of a technique that alleviates these problems by providing a maneuverable balloon as part of the personnel lifting device. This technique may be achieved by incorporating aileron-like flaps (hereinafter "paraflaps") that are maintained in a fully-deployed configuration so as to provide a steering capability by controlling the drag of the balloon.

Moreover, a system incorporating the maneuverable balloon may be used to provide an amusement ride or game wherein one or more users may adjust the apparatus so as to achieve a preferred net lift.

Features of the present invention also overcome the need to construct a tower or other mechanical structure so as to provide an elevated platform from which to jump. The present invention further contemplates the use of an elevator balloon that may be selectively decoupled from the personnel lifting device once a desired elevation is reached.

The techniques described herein are advantageous because they provide an efficient method of offering user-controlled lifting, wherein the apparatus may be employed as an amusement. The various efficiencies afforded by aspects of the invention enable the personnel lifting device and amusement applications to be provided in a cost-efficient manner. The techniques of the invention are advantageous because they provide a range of alternatives for use of a personnel lifting device, each of which is useful in appropriate situations. As a result of the invention, the personnel lifting device can be offered in a low cost amusement setting.

BRIEF DESCRIPTION OF THE DRAWINGS

FIGS. 9 and 10 are perspective illustrations of an exemplary detachment mechanism to be used with the personnel lifting device as depicted in FIG. 8.

Figure 1:
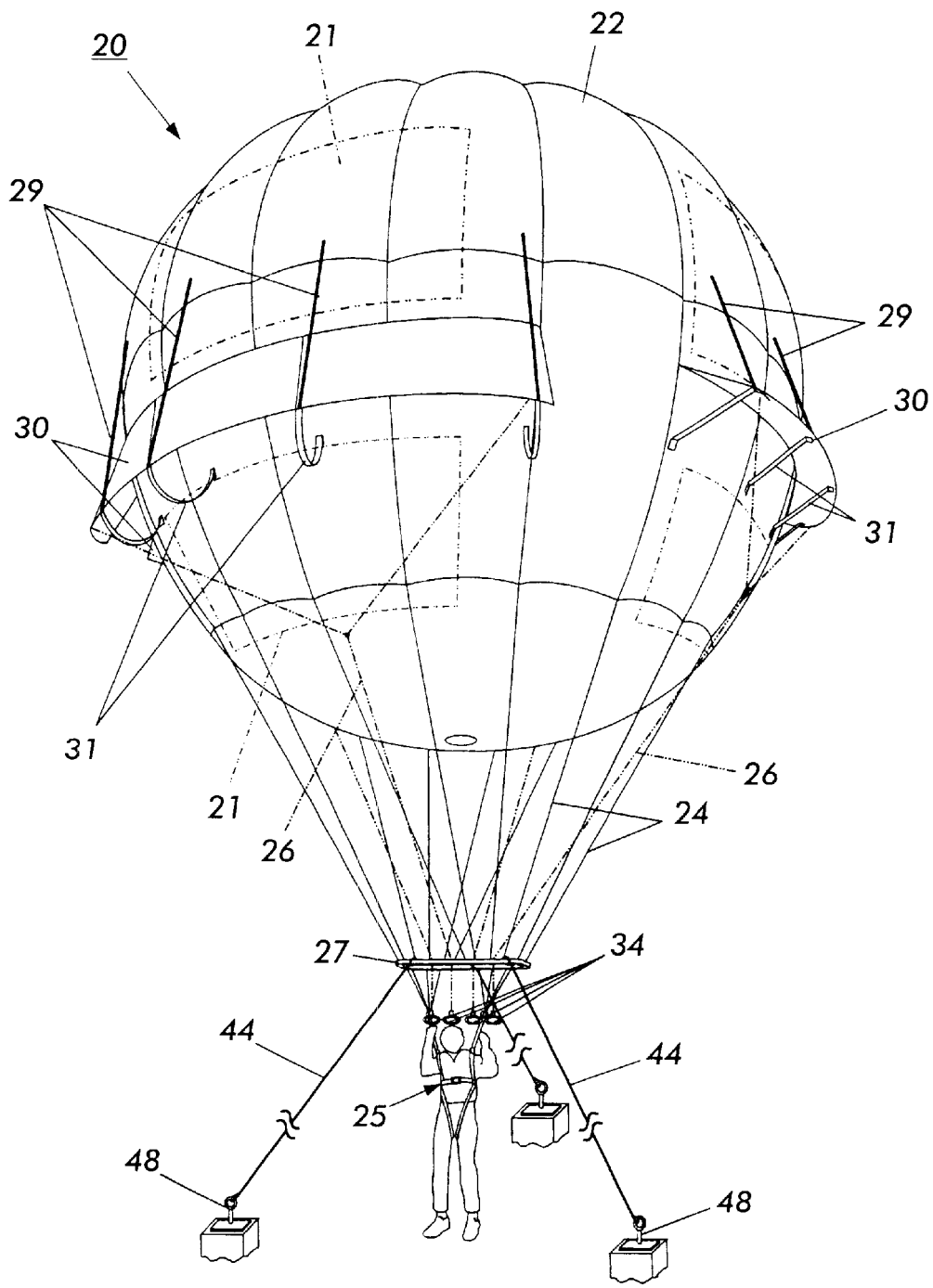
FIG. 1 is an orthographic view of a personnel lifting device in accordance with one aspect of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "paraballoon" is intended to represent the combination of features of a parachute with a balloon, wherein the balloon is preferably inflated with a lighter-than-air gas (e.g., helium) so as to provide a lifting force to an object attached thereto. "Paraflaps" are attachments to the paraballoon and refer to a plurality of aileron-like flaps that are supported by a semi-rigid frame extending from the balloon so as to control the drag of the descending paraballoon and user harnessed thereto.

Turning now to FIG. 1 there is shown an orthographic view of a personnel lifting device or paraballoon in accordance with one aspect of the present invention. Paraballoon 20 includes a balloon 22 and a support assembly 24 enclosing and/or affixed to the balloon. In a preferred embodiment, balloon 22 is constructed of a two fabric envelope, with an inner liner of a light-weight, gas impermeable fabric such as Mylar, and an outer layer of Denier ultra-violet resistant coated nylon with an integrated lattice, 5 ounce/square yard nylon gas-fabric. In normal use the balloon is inflated through a resealable opening (not shown) with a lighter-than-air gas (e.g., helium) to a pressure between 1.0 and 1.2 atmospheres, preferably about 1.003 atmospheres and is then sealed. Preferably the leakage of the gas from the balloon is minimal.

As depicted in FIG. 1, balloon 22 is spherical in shape, having a diameter of at least 18 feet and preferably 22 feet to provide sufficient lifting force to a range of adult user weights. It will be appreciated that smaller balloon sizes may be used for children or smaller adults. The support assembly is comprised of a plurality of lines (ropes or cables) 24 that encircle the balloon on one of a plurality of meridians and are fastened to a weight ring 27. It will be appreciated by those familiar with balloon design that various alternative shapes and sizes are possible in order to control the lift and maneuverability of the paraballoon, including, cylinder, ellipsoid, polyhedron, etc.). In use a user, wearing a parachutist harness 25, is attached via buckles or lockable karabiners to weight ring 27 where the buoyant nature of the balloon will cause the user to experience a reduced net gravitational weight.

As further depicted in FIG. 1, balloon 22 may also include removable display panels 21, that may be lighted, for the display of names or advertising. Such panels are preferably attached via hook-and-loop or snap fasteners so as to make replacement of the display easy. It will also be appreciated that the size or proportion of the paraflaps 30, relative to the balloon, may be increased so that the balloon provides less drag and the paraflaps provide greater drag, thereby reducing the balloon size required for a safe landing from a jump.

Figure 2:
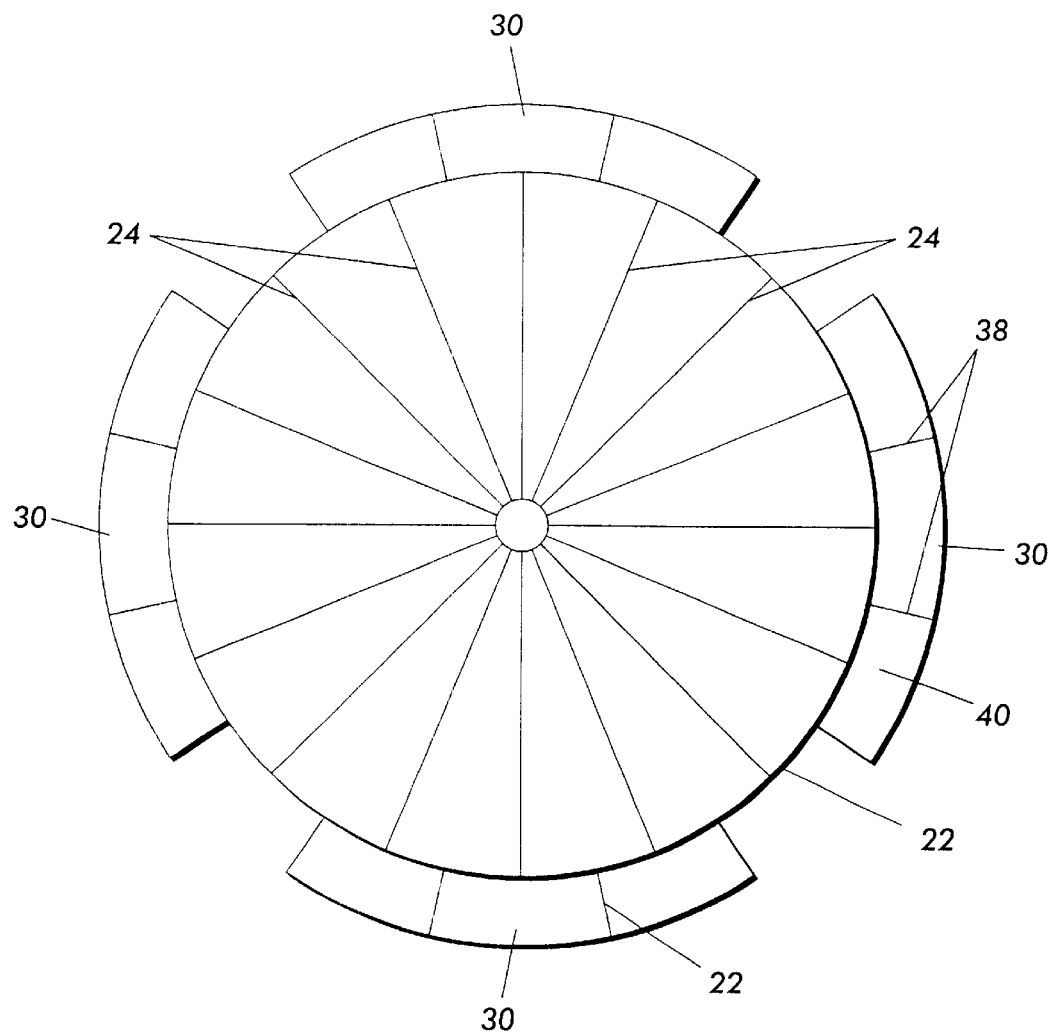
FIG. 2 is a top view of the personnel lifting device of FIG. 1.

Paraballoon 20 also preferably includes a plurality of paraflaps 30 extending outward from the balloon along a circumferential arc midway between the top and bottom of the balloon. As depicted in FIGS. 1 and 2, at least three and preferably four paraflaps are included so as to provide left-right, front-back attitude adjustments to the user. As seen in FIG. 1, the attitude of the front and side paraflaps are adjustable by pulling on handles 34, each of which is connected to a respective paraflap by lines 26. Pulling on a handle draws the respective paraflap down toward the bottom of the paraballoon and reduces the drag caused by the paraflap when the paraballoon is descending. A user is, therefore, able to control the rate and direction of descent of the paraballoon by pulling on the handles 34.

Placement of the paraflaps is preferably around a horizontal hemispherical arc for the spherical balloon. However, other balloon shapes may be employed, including a cylinder; a regular polygon; and an ellipsoid. In each of these shapes, the location of the paraflaps is preferably about the balloon at a location that maximizes the total cross sectional area of the balloon and the paraflaps combined. Furthermore, the location is preferably at or above a center of gravity location for the paraballoon shape. For example, on a cylindrical balloon that is oriented with its longitudinal axis in a vertical direction, the paraflaps would preferably be placed above a midpoint of the longitudinal axis so as to provide stability for the balloon.

As illustrated in FIG. 2, the paraflaps 30 are comprised of a semi-rigid frame 38 made out of aluminum or plastic tubing (e.g., poly-vinyl chloride) over which is wrapped or stretched a continuous piece of tightly woven fabric 40 or equivalent that is both strong and light-weight and generally restricts the flow of air therethrough as in a parachute or kite (e.g., mylar, nylon, etc.). Because the frame maintains the paraflaps in a fully extended configuration, there is no requirement for any descent of the paraballoon in order to cause the paraflaps to billow before they can provide drag and affect the direction of the paraballoon. In a preferred embodiment, the paraflaps are maintained in an extended position (generally horizontal) by at least one elasticized upper tether line 29 and at least one fixed length lower tether line 31. Such an arrangement of elasticized and fixed length paraflap tethers maintains the paraflaps in a position to maximize their drag.

As depicted in FIG. 2, paraflaps 30 encircle the paraballoon along a continuous arc that is parallel with the horizon, the paraflaps covering approximately 75–100 percent of the arc. Furthermore, the paraflaps extend radially outward from the balloon 22 for a distance of approximately 2–30 percent of the radius of the balloon, and preferably 5–15 percent of the radius. It will be further appreciated that the paraflaps, meridian lines, and tether lines associated with the paraballoon are preferably fastened or attached to the paraballoon at reinforced points along the outermost layer of the balloon material so as to reduce the stress on the balloon fabric, and to prevent degradation and ultimate leakage of the light-than-air gas therefrom. It is possible, however, to use paraflaps of a different size and structure, and various alternatives are intended to be incorporated herein.

In the embodiment of FIG. 1, the user and the paraballoon are tethered to the ground using a plurality of lightweight tethers (e.g., ropes, cables) that are preferably attached to ground anchors 48. Ground anchors 48 are preferably fixed mounts with a predetermined length of line (rope, cable, etc.) attached thereto. Alternatively, the mounts may also include manual or automatic winch-type devices that allow the tether to be extended or retracted so as to control the range of motion (vertical and/or horizontal) of the user and attached paraballoon. In addition to the limiting tethers, the harness and/or paraballoon are preferably linked, via an additional line or tether to an attendant on the ground, and in turn a ground anchor. Hence, the attendant is able to control the maximum height of the paraballoon and rider.

Figure 3:
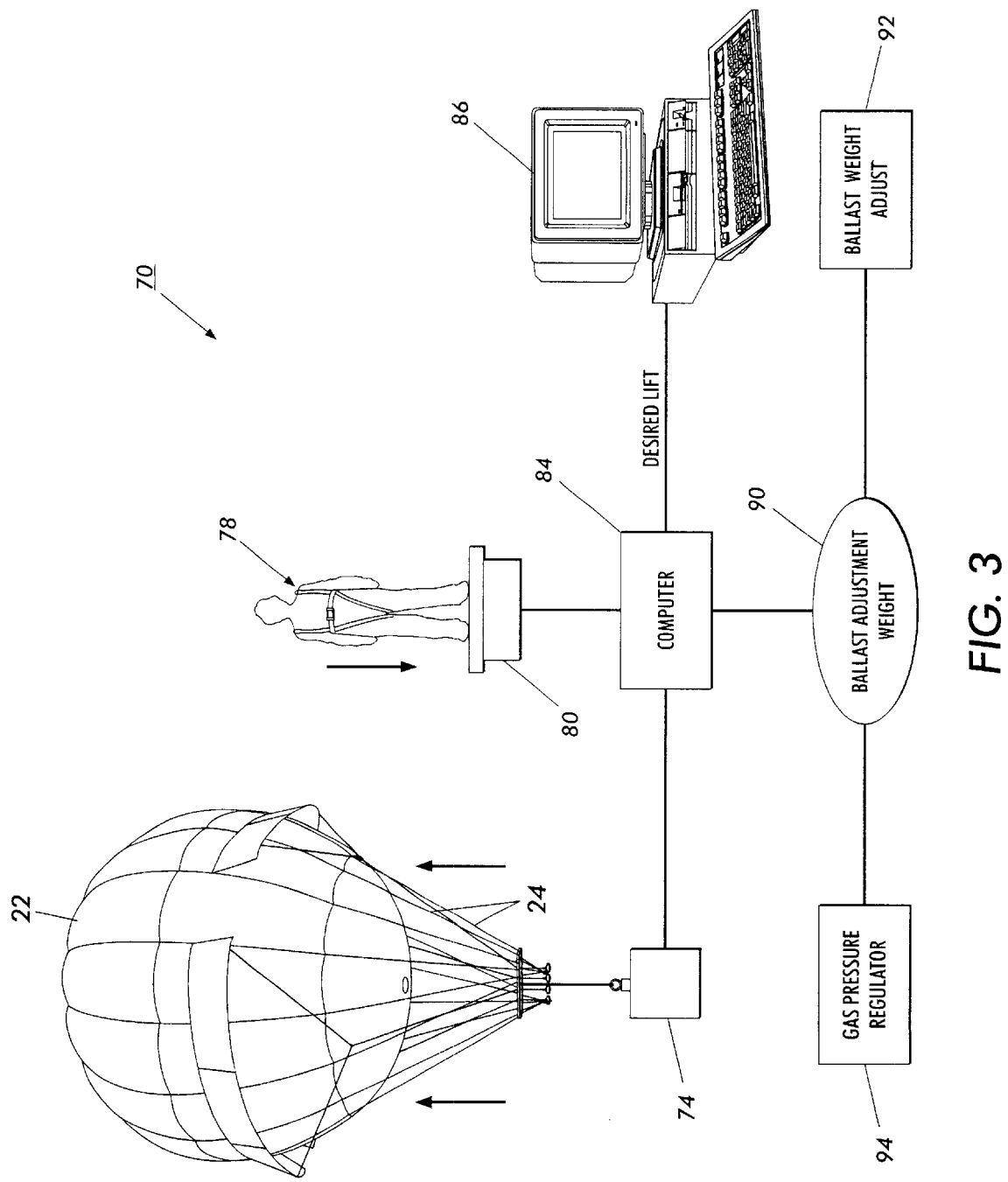
FIG. 3 is a block diagram of a system for automatically controlling the net downward force for a particular user.

In accordance with the embodiment depicted in FIG. 3, the personnel lifting device described herein may be adjusted to each particular user so as to provide a predetermined, reduced "net downward force." As used herein, the net force is preferably a downward force so as to avoid weightlessness, but may be adjustable to suit user's preference, or to a common magnitude across multiple users as might be desired when using the personnel lifting devices in an amusement setting as will be described in detail below. FIG. 3 illustrates the essential components of a gravitational force adjustment system 70 for accurately controlling the net lifting force of a personnel lifting device that includes a sealed, inflatable balloon 22 filled with a lighter-than-air gas and a support assembly 24 attached for suspending an individual below the balloon.

Initially, the gross lifting force of the personnel lifting device must be determined using a strain gauge 74 or similar force sensing means for determining the lifting force created by the personnel lifting device. In a manual implementation, the force sensing means may be a spring-scale positioned so as to indicate the gross lifting force. The weight of the user 78, preferably with the parachute harness on, is determined using a well-known scale 80 (or equivalently a load cell), and preferably one in which the weight (force due to gravity) is capable of being represented an output as an electronic signal. As depicted in FIG. 3, the signals from load cell 74 and scale 80 are both provided as inputs to a computer 84, programmed so as to operate as a net downward force calculator (or equivalent height/terminal velocity calculator). The computer receives the gross lifting force from load cell 74, the weight of the individual from scale 80, as well as a selected or programmed limiting terminal velocity (converted to a desired lift) from an input terminal 86. The computer processes the three inputs to produce a ballast adjustment weight in accordance with the following equations:

Total Weight=Buoyant Upward Force+Balloon Drag+Paraflap Drag (1)

$$W_1 + W_2 + W_3 = [(\rho_A - \rho_{He})V_B] + \left[\frac{\mu_B \rho_A v_t^2 A_B}{2}\right] + \left[\frac{\mu_{pf} \rho_A v_t^2 A_{pf}}{2}\right] \quad (2)$$

where Total Weight=$W_1+W_2+W_3$ and $W_1$ is the weight of the balloon, $W_2$ is the weight of the person and $W_3$ the ballast weight to be added; where Buoyant Upward Force= $(\rho_A-\rho_{He})V_B$ and $\rho_A$ is the density of air, $\rho_{He}$ is the density of the lighter-than-air gas (Helium) and $V_B$ the volume of the balloon; where the Balloon Drag=

$$\left[\frac{\mu_B \rho_A v_t^2 A_B}{2}\right]$$

and $\mu_B$ is the drag coefficient for the balloon, $v_t$ is the terminal velocity desired and $A_B$ is the cross-sectional area of the balloon; and where the Paraflap Drag=

$$\left[\frac{\mu_{pf} \rho_A v_t^2 A_{pf}}{2}\right]$$

and $\mu_{pf}$ is the drag coefficient for the paraflap and $A_{pf}$ is the cross-sectional area of the paraflaps when extended. Therefore, the ballast weight is:

$$W_3 = [(\rho_A - \rho_{He})V_B] + \left[\frac{\rho_A v_t^2}{2}\right](\mu_B A_B + \mu_{pf} A_{pf}) - (W_1 + W_2). \quad (3)$$

In this form, one picks a desired terminal velocity. However, knowing that a terminal velocity of a person jumping from a particular height ($H_{equiv}$) is given by:

$$H_{equiv} = \left(\frac{v_t^2}{2g}\right) \quad (4)$$

the terminal velocity may be determined as:

$$v_t^2 = H_{equiv} 2 \, g. \quad (5)$$

Substituting and solving for ballast weight ($W_3$), Equation 3 becomes:

$$W_3 = \rho_A + \rho_{He})V_B + P_A H_{equiv}^2 \, g \, (\mu_B A_B + \mu_{pf} A_{pf}) - (W_1 + W_2) \quad (6)$$

and $$W_3 = \rho_A H_{equiv} 2 \, g \, (\mu_B A_B + \mu_{pf} A_{pf}) + \text{GrossLiftingForce} \quad (7)$$

The following table illustrates exemplary calculations for a spherical balloon in accordance with the equations provided herein to determine the ballast weight necessary for a user to achieve a desired terminal velocity, given the lifting force of the PLD and the weight of the user. For a spherical balloon approximately 20 feet in diameter, the balloon would have a gross lifting force of approximately 260 pounds, a cross-sectional area of 29 square meters, a surface area of 117 square meters, the weight of the balloon and harness would be approximately 91 pounds and the cross-sectional area of the paraflaps would be approximately 6 square meters.

| $H_{equiv}$ (INPUT) | User Wt. (INPUT) | Total Wt. | Ballast Wt. To add ($W_3$) |
|---|---|---|---|
| 0.5 ft | 180 | 271 | 11 |
| 1.0 | 180 | 271 | 28 |
| 1.5 | 180 | 271 | 44 |
| 2.0 | 180 | 271 | 60 |
| 2.5 | 180 | 271 | 77 |
| 0.5 ft | 200 | 291 | −9* |
| 1.0 | 200 | 291 | 8 |
| 1.5 | 200 | 291 | 24 |
| 2.0 | 200 | 291 | 40 |
| 2.5 | 200 | 291 | 57 |

*"−" indicates that the weight of the rider exceeds the limit for the terminal velocity selected As will be appreciated by those skilled in balloon design and operation, the Ballast Weight (represented by block 90) may be adjusted in at least two ways. First, the adjustment weight may be accomplished by altering the weight of ballast operatively associated with the personnel lifting device. In particular, the adjustment is preferably made to a weighted ballast attached to the balloon (e.g., weight bar) or applied directly to the user and harness, or a combination thereof. Such an embodiment is represented by the ballast weight adjustment display 92, which may be a value displayed on terminal 86. Although not desirable, the adjustment weight might also be accomplished by modifying the gas pressure and/or volume of the balloon 22 as represented by pressure regulator 94.

In a preferred embodiment, the calculation is completed by computer 84 both automatically and continuously until adjustments sufficient to achieve the selected lifting force have been accomplished. In an alternative embodiment, the Gross Lifting Force may be accurately estimated as a function of the size, shape and lighter-than-air gas pressure of the balloon. It will also be appreciated that a user may be harnessed and connected to the personnel lifting device, thereby directly determining the Net Lifting Force of Eq. (1) using the sale 80. However, to do so prevents a user from paying for the ride and being rigged and ballast adjusted beforehand.

Referring next to FIGS. 4–7, FIG. 4 is a perspective view of an amusement application for the personnel lifting device. A particular application for the personnel lifting device is in a game-like setting wherein a user attached to the personnel lifting device tries to complete an obstacle course or tries to score a goal (not shown) while attached to the personnel lifting device. As depicted in the figure, obstacle course 118 is composed of a plurality of obstacles that must be navigated by a user while wearing the personnel lifting device (120). Obstacles include, but are not limited to, mounds or roughed terrain (e.g., bunkers) 122, elevated platforms 124 of varying heights, horizontal beams 123, trenches 125, and targets 127 to aim for when descending from above. Obstacles may also include fans 126 installed below the playing surface of the obstacle course or on the elevated platforms, wherein the fan directs airflow in a predetermined direction (e.g., upward), the airflow being sufficient to cause the user and the personnel lifting device to be moved. For example, when the airflow is directed upward or vertically, and the fan is activated as a user approaches in proximity of the fan, the user and personnel lifting device may be pushed off the playing surface and temporarily suspended above the surface.

As will be appreciated obstacles may further include a scoring object (e.g., a basketball, football, etc.) and a target may be employed and a goal scored by moving the scoring object to the target. For example, a basketball-like game could be played with an elevated hoop (not shown) to which the user must jump or bounce, under the assistance of the personnel lifting device, in order to shoot the ball therethrough. The amusement may also consist of a football-like setting, where one or more players on each team are attached to the personnel lifting device and try to advance the ball to the opposing teams goal area (e.g., end zone or similarly marked area. It will be further appreciated that while such games may be conducted with personnel lifting devices tethered to the ground, it is preferred that the personnel lifting devices be constrained by a structure (building, screen/netting, inflatable dome, etc.) so as to allow unconstrained movement with the structure.

Figure 4:
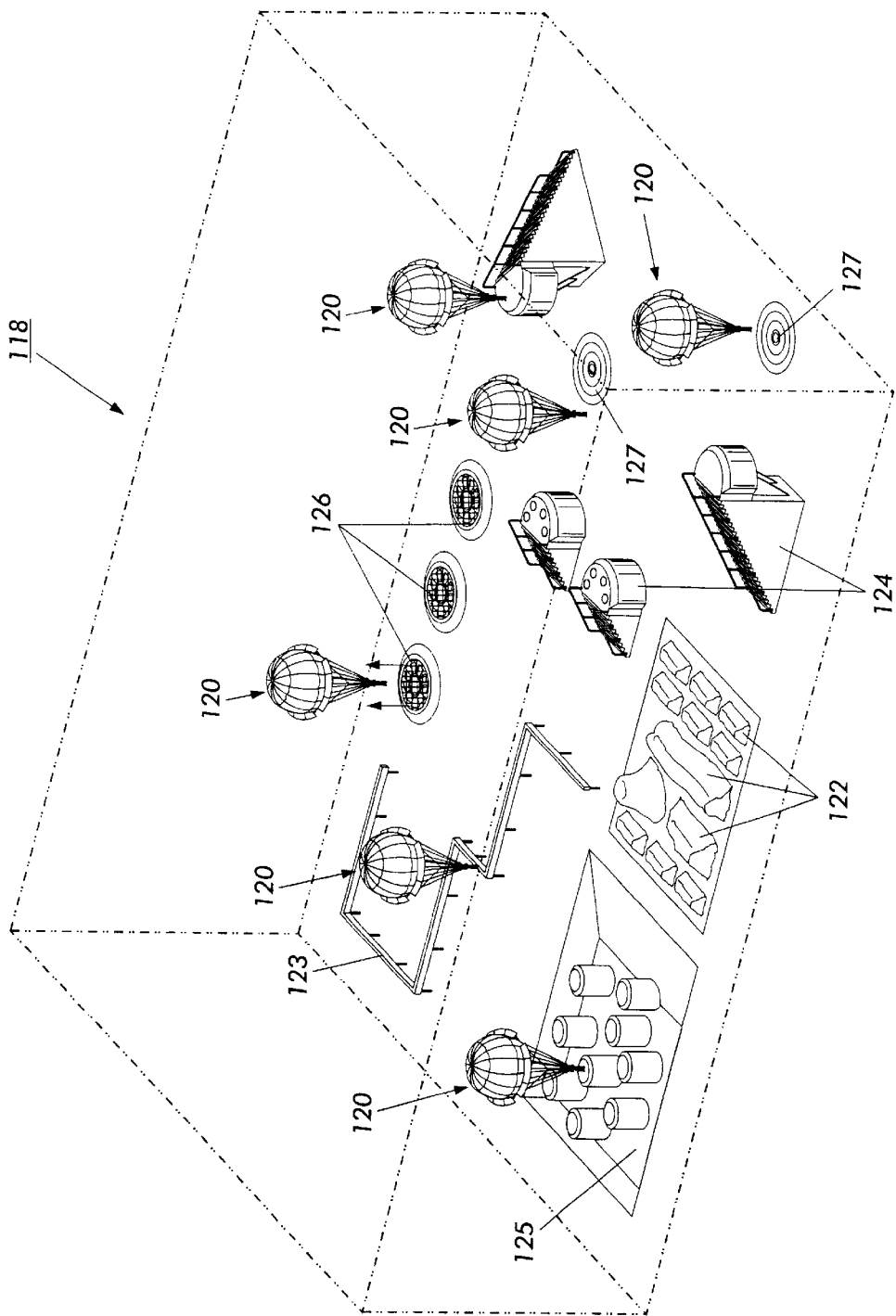
FIG. 4 is a perspective view of an amusement application for the personnel lifting device of FIG. 1.
Figure 5:
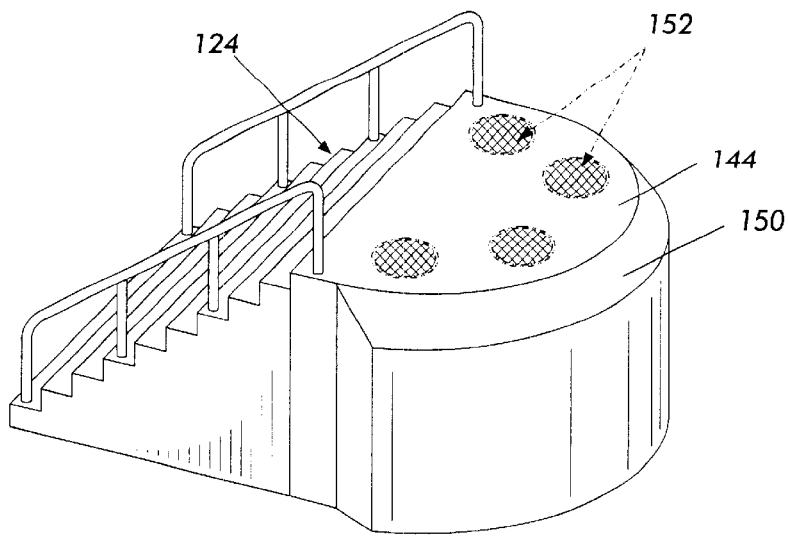
FIGS. 5 and 6 are exemplary illustrations of elevated jumping towers constructed in accordance with aspects of the present invention.
Figure 6:
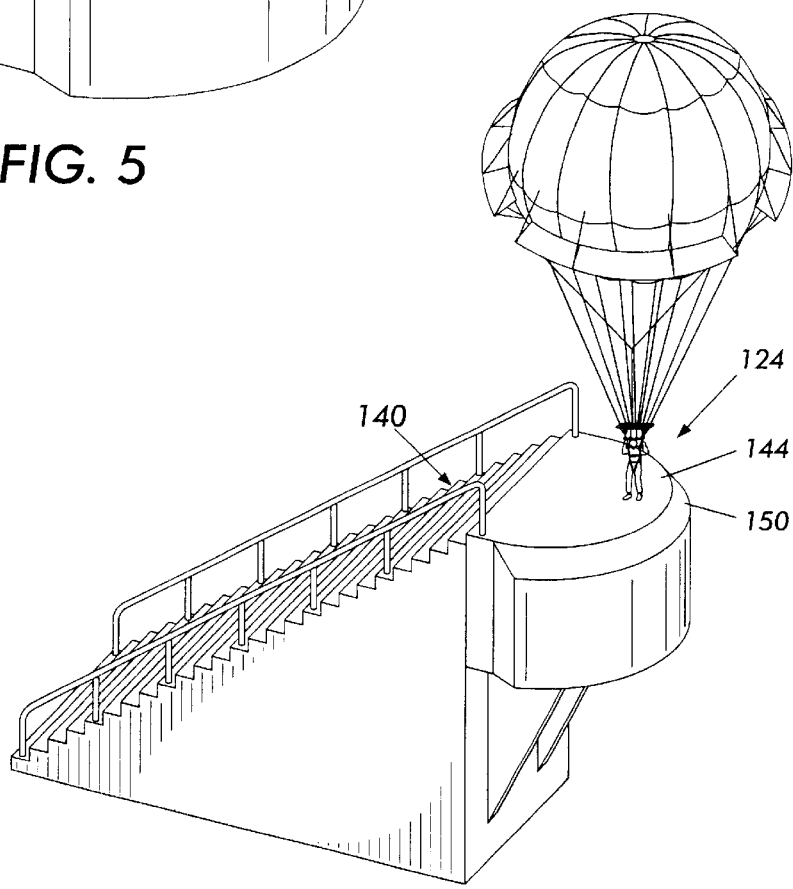

Referring also to FIGS. 4 and 5, there are depicted exemplary elevated jumping towers 124 constructed in accordance with aspects of the present invention. In each tower, the user uses a set of steps 140 to walk or bound to the top of the platform 144 before jumping off under the assistance of the personnel listing device. Jumping towers 124 preferably range in heights from 10 feet to 50 feet, and may also include targets toward which a user attempts to jump and/or maneuver the personnel lifting device while descending. Each elevated jumping tower preferably includes means for preventing the abrading or tearing of the balloon and harness of the personnel lifting device as the user jumps from the tower. In one embodiment, depicted in FIGS. 4 and 5, the top platform of the towers include a bumper 150 about a periphery of the platform to prevent abrasion of the balloon once a user has jumped. As further illustrated in FIG. 5, the tower platform 144 may also include one or more recessed fans 152, positioned to produce airflow that is directed upward and away from the platform. When a user steps to the edge, the balloon is blown up and out so as to direct it away from the edge of platform 144.

Figure 7:
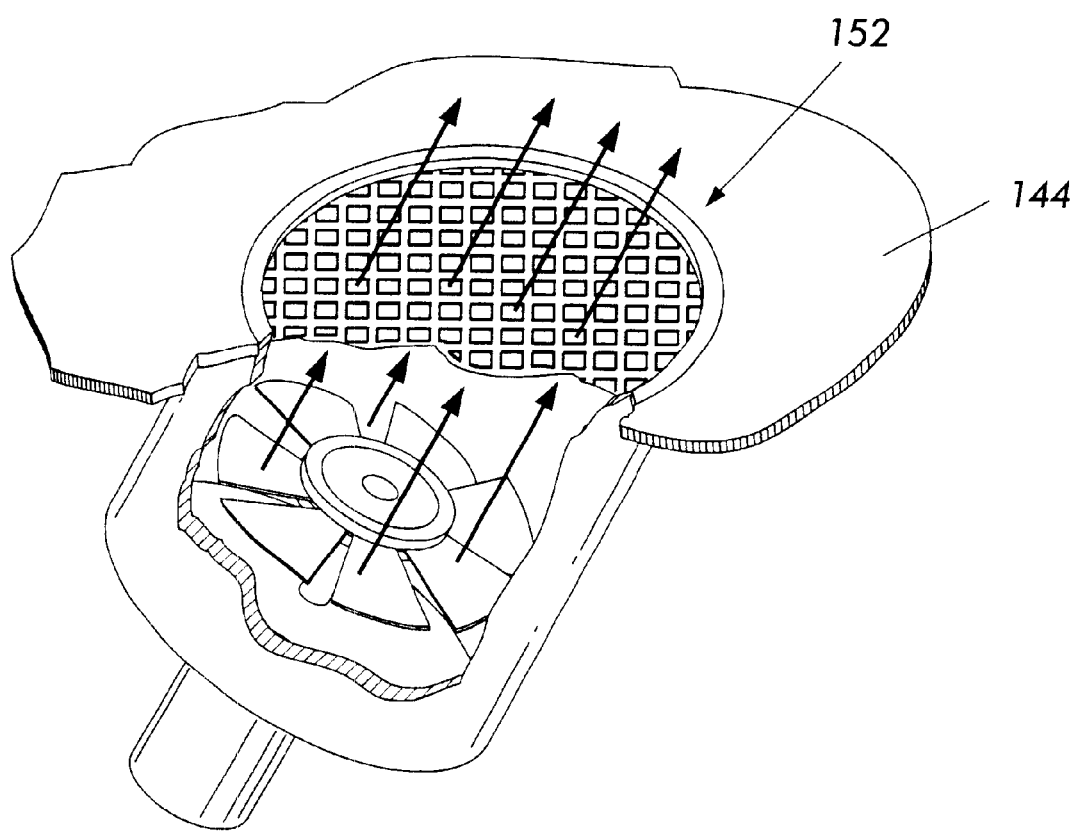
FIG. 7 is a cut-away perspective view of an exemplary fan that may be used in accordance with the jumping tower of FIGS. 5 and 6 or the amusement application of FIG. 4.

FIG. 7 is a perspective view of an exemplary fan that may be used in accordance with the jumping tower of FIGS. 4 and 5 or the amusement application of FIG. 4. Fan is preferably recessed below a surface 170, and has a grated cover 172 across the entire surface thereof to prevent a user's foot from contacting the fan blades 174. The fan blades work in a generally horizontal plane, although the fan assembly may be pivoted or directed so as to produce airflow that is not only vertical. A suitable fan assembly is an industrial fan similar to those used to remove smoke or noxious gases from structures, preferably generating an air flow of at least 2000 cubic-feet per minute.

Figure 8:
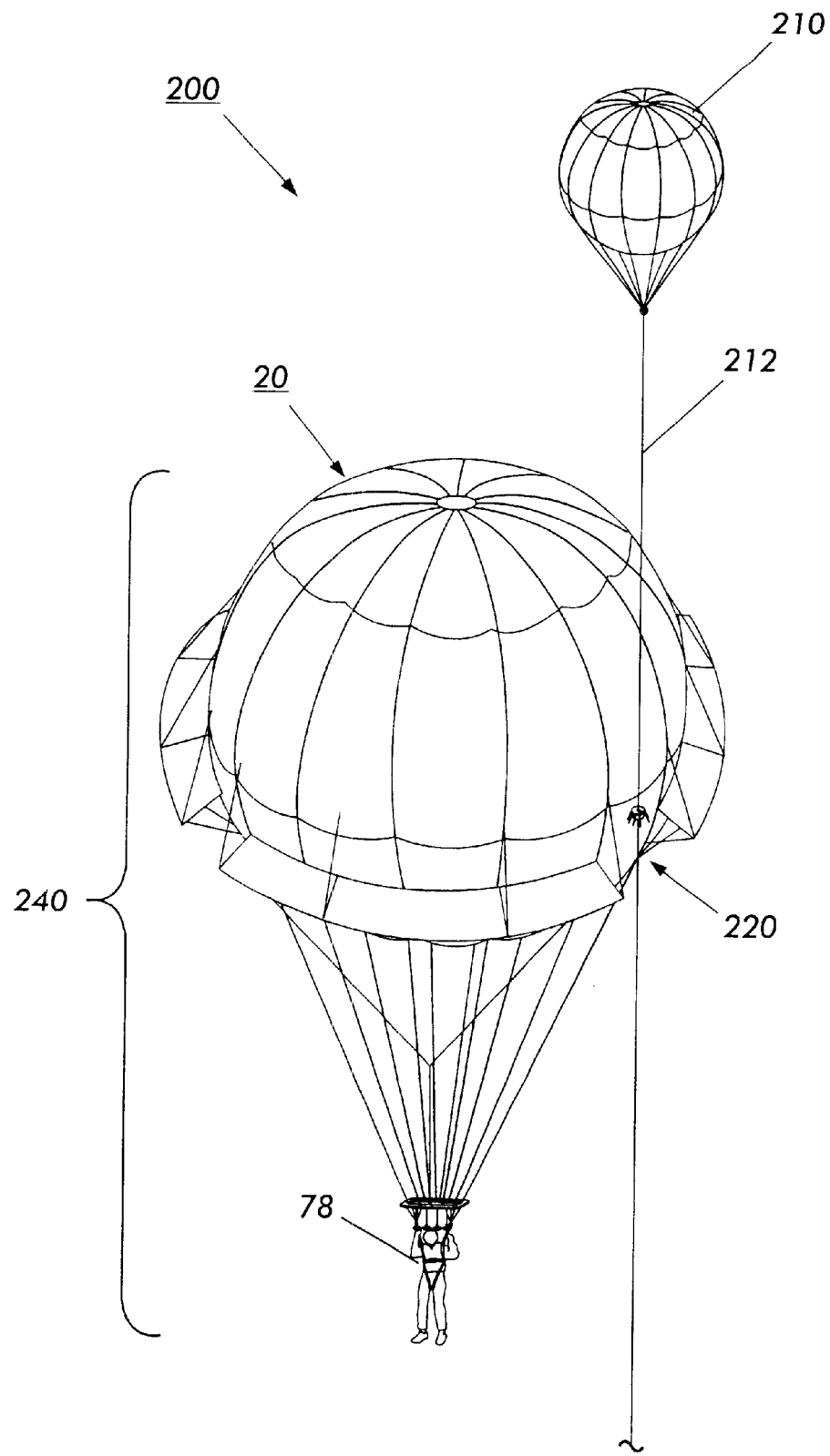
FIG. 8 is a perspective illustration of a the use of an auxiliary lifting balloon in accordance with a further aspect of the present invention.

Referring next to FIG. 8 there is illustrated an alternative system wherein an auxiliary lifting balloon is employed to provide an elevated lift to a user attached to the personnel lifting device. As will be appreciated from the following description described in terms of an amusement ride, the elevated lift system may be employed in situations where it is necessary to move personnel to a higher elevation (e.g., training for parachute jumping, working on towers, etc.). In the embodiment depicted in FIG. 8, the lifting system 200, includes a gravitational force adjustment system 204, providing a slight net downward force for the user 78 and an associated personnel lifting device 20 that has a sealed, inflatable balloon filled with a lighter-than-air gas and a harness for suspending the user below the balloon. In addition, the lifting system includes auxiliary lifting balloon 210 filled with lighter-than-air gas, said auxiliary lifting balloon being temporarily coupled to the gravitational force adjustment system, wherein the lift of the auxiliary lifting balloon in combination with the gravitational force adjustment system provides a net upward lifting force to the user. The height to which the user and the personnel lifting device a raised is a function of the length to which tether 212 is extended from the ground anchor (not shown).

In a preferred embodiment, the user and personnel lifting device may be easily decoupled under control of the user or an attendant on the ground. Referring to FIGS. 9 and 10, which are perspective illustrations of an exemplary mechanism, detachment mechanism 220 includes a generally spherical or disc-shaped element 222 suspended from the tether 212 and capable of being affixed at a desired position along the tether. Attached to the personnel lifting device is an inverted cup-shaped connector 224, preferably having a slot 226 therein to receive the tether 212. Connector 224 is operatively attached to the personnel lifting device, preferably along a horizontal hemisphere of the balloon. In operation, the spherical-shaped element 222 is retained within the cup-shaped connector so long as the auxiliary lifting balloon (not shown) is providing an upward lifting force via tether 212. The auxiliary lifting balloon (not shown) is detached from the connector 224, and the personnel lifting device, by swiftly pulling the tether downward so as to move the spherical-shaped element from within the control of the connector.

It will be appreciated that various modifications of the detachment mechanism design are possible, including inverting the mechanism and applying the connector to the tether and the disc or sphere to the balloon. Furthermore, the although the cup-shaped connector preferably includes a set of downward-facing fingers 228, to facilitate grasping the disc element, it is possible to use a bowl-shaped connector that does not have any fingers extending therefrom. The spacing of fingers 228 is preferably such that the width of the spaces therebetween is, at most, less than the diameter of the spherical-shaped element.

Figure 11:
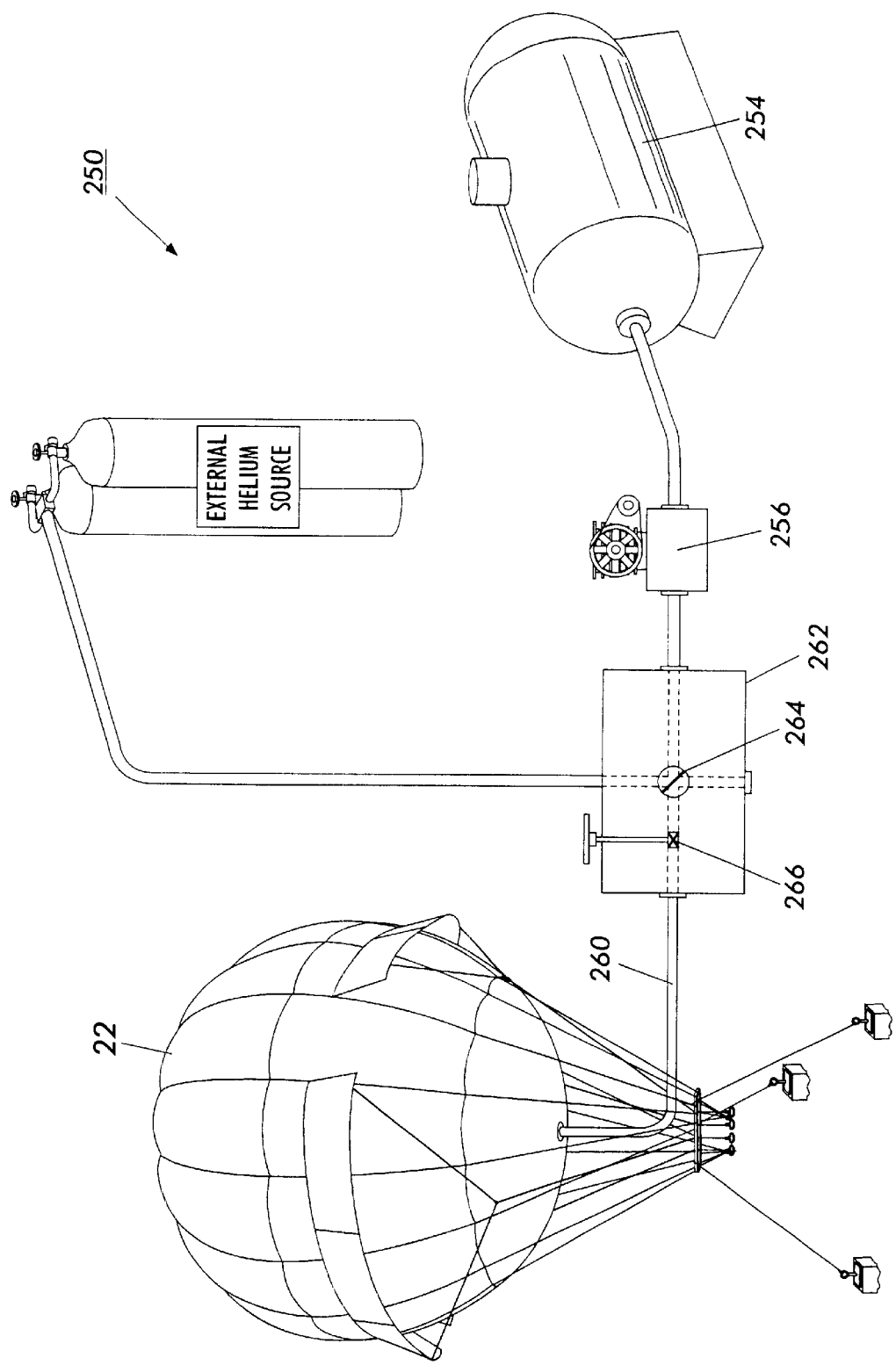
FIG. 11 is a block diagram illustrating the various components of a gas storage system used in association with the exemplary embodiments described with respect to the present invention.

Referring next to FIG. 11, there is illustrated a block diagram with various components of a gas storage system used in association with various embodiments described herein. Gas storage system 250 for a lighter-than-air balloon 22 preferably comprises a low to medium pressure storage tank 254 and a compressor 256 to pump the lighter-than-air gas from the balloon to the storage tank. It will be appreciated that additional equipment may also be incorporated in a refill/recharge system as illustrated in the figure. For example, partial deflation of the balloon 22 is enabled when the compressor operates to pump the lower pressure gas from balloon 22, via hose 260 and manifold 262. In general, the pressure within storage tank 254 will preferably be on the order of three to fifteen times the nominal pressure of the gas applied to the balloon (1.003 atm. Normal) and up to 200 atmospheres, however a wide range of pressures may be suitable. By pumping the gas to a storage tank and reducing the pressure within the balloon, the leakage from the balloon is significantly reduced. Furthermore, the at least partial deflation of the balloon facilitates its storage and/or transportation. In a preferred embodiment, a Henderson A21-18 multi-stage compressor may be used. While a single-stage compressor may be employed, it may not be possible to achieve a significant volume reduction when using Helium gas, thereby requiring a larger storage tank or a supplemental, high-pressure gas source.

It will be further appreciated that manifold 262 may also include a valve 264 that allows an additional, high-pressure, gas source to be applied to the system, in order to initially charge the system with gas and to recharge in the event of a leak or pressure loss. Manifold 262 also preferably includes a valve or pressure regulator 266 to enable the system to be inflated to a desired pressure/volume.

In recapitulation, the present invention is an apparatus to partially counter normal gravitational force, and more particularly to various features of a paraballoon, wherein the paraballoon apparatus may be used as a component of an amusement.

It is, therefore, apparent that there has been provided, in accordance with the present invention, a personnel lifting apparatus. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A lifting system, including:

a personnel lifting device including a sealed, inflatable balloon filled with a lighter-than-air gas and a harness attached thereto for suspending the user below the balloon; and an auxiliary lifting balloon filled with lighter-than-air gas, said auxiliary lifting balloon being temporarily coupled to the personnel lifting device, wherein the auxiliary lifting balloon in combination with the personnel lifting device provides a net upward lifting force to the user.

2. The lifting system of claim 1, wherein the auxiliary lifting balloon is retractable attached to the ground with a tether and where the user is allowed to ascend to a higher elevation under the control of the tether.

3. The lifting system of claim 1, further including a detachment mechanism whereby the auxiliary lifting balloon may be detached from the gravitational force adjustment system under the control of the user.

4. The lifting system of claim 3, wherein the detachment mechanism includes:

a flexible tether extending downward from the auxiliary lifting balloon;

a generally disc-shaped element suspended from the tether; and an inverted cup-shaped connector having a slot therein and operatively connected along a horizontal hemisphere of the gravitational force adjustment system balloon, wherein the disc-shaped element is retained within the cup-shaped connector so long as the auxiliary lifting balloon is providing an upward lifting force via the tether, whereby the auxiliary lifting balloon is detached from the connector by retracting the tether so as to move the spherical-shaped element from within the control of the connector.

5. The lifting system if claim 4, wherein the cup-shaped connector has a plurality of slots cut therein so as to produce a plurality of fingers extending from a central point, wherein the width of the slot is, at most, less than the diameter of the spherical-shaped element.

* * * * *